(12) United States Patent
Xue et al.

(10) Patent No.: US 11,392,384 B2
(45) Date of Patent: Jul. 19, 2022

(54) METHODS OF BREAKING DOWN COARSE-GRAINED TASKS FOR FINE-GRAINED TASK RE-SCHEDULING

(71) Applicant: Alibaba Group Holding Limited, Grand Cayman (KY)

(72) Inventors: Fei Xue, Sunnyvale, CA (US); Yuhao Wang, Sunnyvale, CA (US); Fei Sun, San Jose, CA (US); Hongzhong Zheng, Los Gatos, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 20 days.

(21) Appl. No.: 17/013,384

(22) Filed: Sep. 4, 2020

(65) Prior Publication Data

US 2022/0075622 A1    Mar. 10, 2022

(51) Int. Cl.
| | |
|---|---|
| *G06F 9/38* | (2018.01) |
| *G06F 9/30* | (2018.01) |
| *G06F 9/48* | (2006.01) |
| *G06F 17/16* | (2006.01) |

(52) U.S. Cl.
CPC ........ *G06F 9/3836* (2013.01); *G06F 9/30145* (2013.01); *G06F 9/3867* (2013.01); *G06F 9/4881* (2013.01); *G06F 17/16* (2013.01)

(58) Field of Classification Search
None
See application file for complete search history.

(56) References Cited

U.S. PATENT DOCUMENTS

| | | | |
|---|---|---|---|
| 5,745,722 A | * | 4/1998 | Matsumoto ......... G06F 9/30156 341/51 |
| 5,913,925 A | | 6/1999 | Kahle et al. |
| 6,212,542 B1 | | 4/2001 | Kahle et al. |

(Continued)

FOREIGN PATENT DOCUMENTS

WO    2018009295 A1    1/2018

OTHER PUBLICATIONS

'HAWS: Accelerating GPUWavefront Execution through Selective Out-of-order Execution' by Xun Gong et al., copyright 2019, ACM . (Year: 2019).*

(Continued)

*Primary Examiner* — Steven G Snyder

(57) ABSTRACT

A method of scheduling instructions in a processing system comprising a processing unit and one or more co-processors comprises dispatching a plurality of instructions from a master processor to a co-processor of the one or more co-processors, wherein each instruction of the plurality of instructions comprises one or more additional fields, wherein at least one field comprises grouping information operable to consolidate the plurality of instructions for decomposition, and wherein at least one field comprises control information. The method also comprises decomposing the plurality of instructions into a plurality of fine-grained instructions, wherein the control information comprises rules associated with decomposing the plurality of instructions into the plurality of fine-grained instructions. Further, the method comprises scheduling the plurality of fine-grained instructions to execute on the co-processor, wherein the scheduling is performed in a non-sequential order.

20 Claims, 11 Drawing Sheets

(56) References Cited

U.S. PATENT DOCUMENTS

| | | | |
|---|---|---|---|
| 7,886,132 B2 | 2/2011 | Rangan et al. | |
| 8,375,368 B2 | 2/2013 | Tuck et al. | |
| 8,381,202 B2 | 2/2013 | Papakipos et al. | |
| 8,429,636 B2 | 4/2013 | Chou et al. | |
| 8,443,348 B2 | 5/2013 | McGuire et al. | |
| 8,516,222 B1 | 8/2013 | Agarwal et al. | |
| 8,584,106 B2 | 11/2013 | Papakipos et al. | |
| 8,677,105 B2 | 3/2014 | Abdallah | |
| 8,869,121 B2 | 10/2014 | Vorbach et al. | |
| 8,909,902 B2 | 12/2014 | Latorre et al. | |
| 8,972,943 B2 | 3/2015 | Papakipos et al. | |
| 9,787,612 B2 | 10/2017 | Steele et al. | |
| 10,387,319 B2 | 8/2019 | Adler et al. | |
| 10,540,420 B2* | 1/2020 | Kalsi | G06F 7/5443 |
| 10,853,073 B2* | 12/2020 | Fleming, Jr. | G06F 9/5027 |
| 10,896,043 B2* | 1/2021 | Toll | G06F 9/3016 |
| 10,970,076 B2* | 4/2021 | Ould-Ahmed-Vall | G06F 9/3001 |
| 11,029,958 B1* | 6/2021 | Zhang | G06F 9/30014 |
| 11,175,891 B2* | 11/2021 | Rubanovich | G06F 17/16 |
| 2009/0288063 A1 | 11/2009 | Rangan et al. | |
| 2015/0220347 A1* | 8/2015 | Glossner | G06F 9/3885 712/215 |
| 2015/0363230 A1 | 12/2015 | Kasahara et al. | |
| 2016/0378492 A1* | 12/2016 | Gray | G06F 9/38 712/206 |
| 2016/0378496 A1* | 12/2016 | Gray | G06F 9/3836 712/206 |
| 2019/0042245 A1* | 2/2019 | Toll | G06T 1/20 |
| 2019/0042260 A1* | 2/2019 | Ould-Ahmed-Vall | G06F 9/3802 |
| 2019/0102357 A1* | 4/2019 | Babokin | G06F 9/30029 |
| 2020/0104135 A1* | 4/2020 | Toll | G06F 9/30032 |
| 2020/0210182 A1* | 7/2020 | Hughes | G06F 9/30036 |
| 2020/0310756 A1* | 10/2020 | Rubanovich | G06F 7/49947 |

OTHER PUBLICATIONS

Balakrishnan; et al. Modeling Multi-threaded Architectures in PAMELA for Real-time High Performance Applications. 6 pp. http://citeseerx.ist.psu.edu/viewdoc/download?doi=10.1.1.837.249&rep=rep1&type=pdf, 1997.

Nilsson. Coarse-Grained Parallelism ScienceDirect Topics. 14 p. 2020 https://www.sciencedirect.com/topics/computer-science/coarse-grained-parallelism.

Wang et al. Decomposed software Pipelining: A New Approach to Exploit Instruction Level Parallelism for Loop Programs. 13 pp. https://pdfs.semanticscholar.org/17e9/81f100fd4fa632f2fafd1b6544c5bbc73b5a.pdf?_ga=2.86049560.1089865408.1597130408-1552735963.1597130408, 1993.

Christian Plessl. Hardware Virtualization on a Coarse-Grained Reconfigurable Processor. Diss. ETH No. 16742. 156 pp. 2006. https://groups.uni-paderborn.de/pc2/publications/pdfs/plessl06_phdthesis.pdf.

* cited by examiner

METHODS OF BREAKING DOWN COARSE-GRAINED TASKS FOR FINE-GRAINED TASK RE-SCHEDULING

FIELD OF THE INVENTION

Embodiments according to the present invention relate to a method for instruction dependence handling between a master processor and slave co-processors.

BACKGROUND OF THE INVENTION

In recent years, with the end of Moore's law in sight and with the advent of processors based on the RISC-V architecture, the focus of chip and device makers is on software programmable co-processors or accelerators, e.g., artificial intelligence (AI) accelerators. For example, accelerators speed up processes such as artificial neural network (ANN) tasks, machine learning (ML) and machine vision. Accelerators free up the main processor or processor cores (in multi-core and many-core processors) from having to deal with complex chores that can be resource-intensive. Hardware acceleration has many advantages, the main one being speed. Accelerators can greatly decrease the amount of time it takes to conduct certain tasks, e.g., training and executing an AI model.

FIG. 1 illustrates a conventional processing system comprising a master processor and a slave co-processor. The master processor 104 issues commands/instructions 106 to a slave co-processor 126 and the slave co-processor 126 transmits a response 102 back to the master processor 104 in response to the instruction transmitted.

There can be several challenges associated with designing a command interface between a master processor a slave co-processor (e.g., an accelerator). One of the challenges involves choosing the most efficient instruction set architecture for transmitting and receiving information between the master processor and the slave co-processors. For example, designers of the processing system need to select either a coarse-grained or a fine-grained instruction design.

FIG. 2 illustrates a processing system using a coarse-grained architecture comprising a master processor and a slave co-processor. The master processor 241 issues coarse-grained instructions or commands 256 to the co-processor or accelerator 252. The co-processor 252 subsequently issues a response 288 to the master processor 241. The instructions or command 256 may, for example, comprise a general matrix multiply (GeMM) instruction 212, which is a coarse-grained instruction associated with a matrix multiplication operation that consolidates several operations into a single instruction. Because all the information pertaining to the multiplication operation is included within a single command, the co-processor 252 receives all the information necessary (from the single command) to determine how to pipeline the instruction and execute the various operations (e.g., load, store, compute, etc.) in the correct order required to perform the matrix multiplication.

A coarse-grained instruction set architecture is efficient and allows the processor to offload some processing burden onto the co-processor. For example, instead of issuing several smaller-sized fine-grained instructions, the master processor can issue a single larger-sized coarse-grained instruction to the co-processor, where the co-processor would then be responsible for breaking down the instruction further prior to execution. Another benefit of coarse-grained instructions is that because operations are consolidated into fewer instructions, the problem of handling dependencies between instructions is not as pronounced as it is in fine-grained systems. Nevertheless, a coarse-grained architecture suffers from a few drawbacks. For example, the instruction set is typically not generalized and is difficult to adapt to new operations changes in software. Further, the instruction set is difficult to parallelize because the instructions are best suited for sequential processing on a particular compute unit.

FIG. 3 illustrates a processing system using a fine-grained architecture comprising a master processor and a slave co-processor. The master processor 356 issues coarse-grained instructions or commands 364 to the co-processor or accelerator 334. The co-processor 334 subsequently issues a response 363 to the master processor 356. The instructions or command 364 may, for example, comprise command set 313 to perform the same general matrix multiply (GeMM) operation (which is communicated using a single command 212 in a coarse-grained system such as the one shown in FIG. 2). As shown in FIG. 3, the GeMM operation is broken down into three separate commands (in command set 313) for the fine-grained architecture of FIG. 3.

A fine-grained architecture addresses some of the drawbacks of coarse-grained architectures. For example, unlike coarse-grained instruction sets, fine-grained instruction sets are general and flexible. However, fine-grained architectures have their own drawbacks. For example, fine-grained architectures require increased communication between a master and its co-processors because programs need to be broken down into large numbers of small tasks, which results in increased communication and synchronization overhead. Further, fine-grained instruction set architectures need more sophisticated mechanisms to address instruction dependence because instructions are broken down into large numbers of small tasks that may be dependent on each other.

Referring to FIG. 3, for example, the three instructions in instruction set 313 are related to performing the same matrix multiplication operation. Prior to the instruction set 313 being transmitted to the co-processor 334, it does not have any information regarding the dependence between the three instructions. For example, the co-processor may not have the information necessary to determine that the first two operations within instruction set 313 need to be performed prior to the third operation. Or, for example, that the first two operations are matrix load operations that can be performed simultaneously. The co-processor may also not have any information regarding whether part of the matrices (loaded during the first two operations of instruction set 313) may be broken down into smaller matrices and processed more efficiently. Accordingly, fine-grained systems need to be more sophisticated at handling dependencies.

Due to the complexities of designing processing systems, in particular for AI applications, processing systems that can efficiently integrate accelerators with processors (e.g., multi-core, many-core processors, etc.) and can further address dependencies between instructions at a fine-grained level so that instructions can be re-scheduled efficiently are the subject of considerable innovation.

BRIEF SUMMARY OF THE INVENTION

Accordingly, a need exists for a test methodology that can address the problems with the systems described above. Using the beneficial aspects of the systems described, without their respective limitations, embodiments of the present invention provide novel solutions to address these problems.

Embodiments of the present invention provide a software and hardware system that supports extending the instruction set architecture and adding additional fields or tags within the instruction containing further information regarding dependencies within the instructions. These additional fields or tags provide additional information for the co-processors or accelerators regarding how to pipeline, combine, re-schedule or group fine-grained instructions together. The tagged instruction extension and the hardware support for the extension allow a developer to program the accelerator in such a way so as to address dependencies in a program more efficiently. The hardware configured with the extended instruction architecture supports the scaling and optimization of the system.

Embodiments of the present invention further provide a method of breaking down and re-scheduling tasks in a processing system comprising one or more processors (e.g., processors with multiple cores, many-core processors, etc.) and one or more co-processors or accelerators. Each processor, in one implementation, is able to offload tasks to any co-processor in the system. In one embodiment, each co-processor may receive multiple instructions from the processor and each co-processor may be configured to group separate instructions and further break down instructions in each group (into finer-grained instructions) based on certain rules. Thereafter, each co-processor may be configured to re-schedule the fine-grained instruction sets.

In one embodiment, a method of scheduling instructions in a processing system comprising a processing unit and one or more co-processors is disclosed. The method comprises dispatching a plurality of instructions from a master processor to a co-processor of the one or more co-processors, wherein each instruction of the plurality of instructions comprises one or more additional fields, wherein at least one field comprises grouping information operable to consolidate the plurality of instructions for decomposition, and wherein at least one field comprises control information. The method further comprises decomposing the plurality of instructions into a plurality of fine-grained instructions, wherein the control information comprises rules associated with decomposing the plurality of instructions into the plurality of fine-grained instructions. Further, the method comprises scheduling the plurality of fine-grained instructions to execute on the co-processor, wherein the scheduling is performed in a non-sequential order.

In another embodiment, a processing system for scheduling instructions is disclosed. The processing system comprises a processing device communicatively coupled with a memory and one or more accelerators, wherein the processing device comprises a dispatch unit operable to dispatch a plurality of instructions to an accelerator of the one or more accelerators, wherein each instruction of the plurality of instructions comprises one or more additional fields, wherein at least one field comprises grouping information operable to consolidate the plurality of instructions for decomposition. The system also comprises at least one task queue in the accelerator of the one or more accelerators operable to receive the plurality of instructions and comprising logic circuitry, wherein the logic circuitry is configured to: a) decompose the plurality of instructions into a plurality of fine-grained instructions in accordance with a plurality of programmable rules; and b) schedule the plurality of fine-grained instructions to execute on an execution unit of the accelerator in accordance with the plurality of programmable rules.

In yet another embodiment, an apparatus for scheduling instructions is disclosed. The apparatus comprises a plurality of accelerators communicatively coupled with a processing device. Further, the apparatus comprises at least one task queue in each accelerator of the plurality of accelerators operable to: (a) receive a plurality of instructions from the processing device wherein each instruction of the plurality of instructions comprises one or more additional fields, wherein at least one field comprises grouping information operable to consolidate the plurality of instructions for decomposition, and wherein at least one field comprises control information; (b) decompose the plurality of instructions into a plurality of fine-grained instructions, wherein the control information comprises rules associated with decomposing the plurality of instructions into the plurality of fine-grained instructions; and (c) schedule the plurality of fine-grained instructions to execute on the accelerator.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

Figure 1:
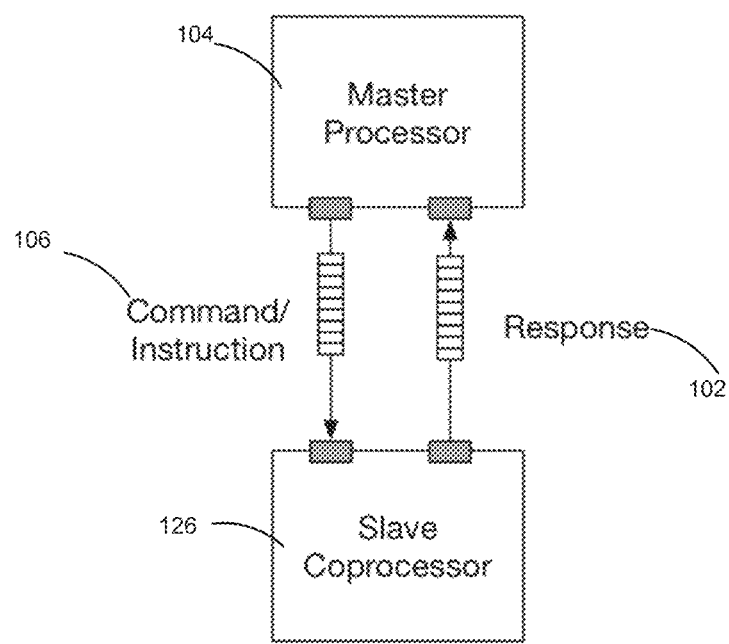
FIG. 1 illustrates a conventional processing system comprising a master processor and a slave co-processor.
Figure 2:
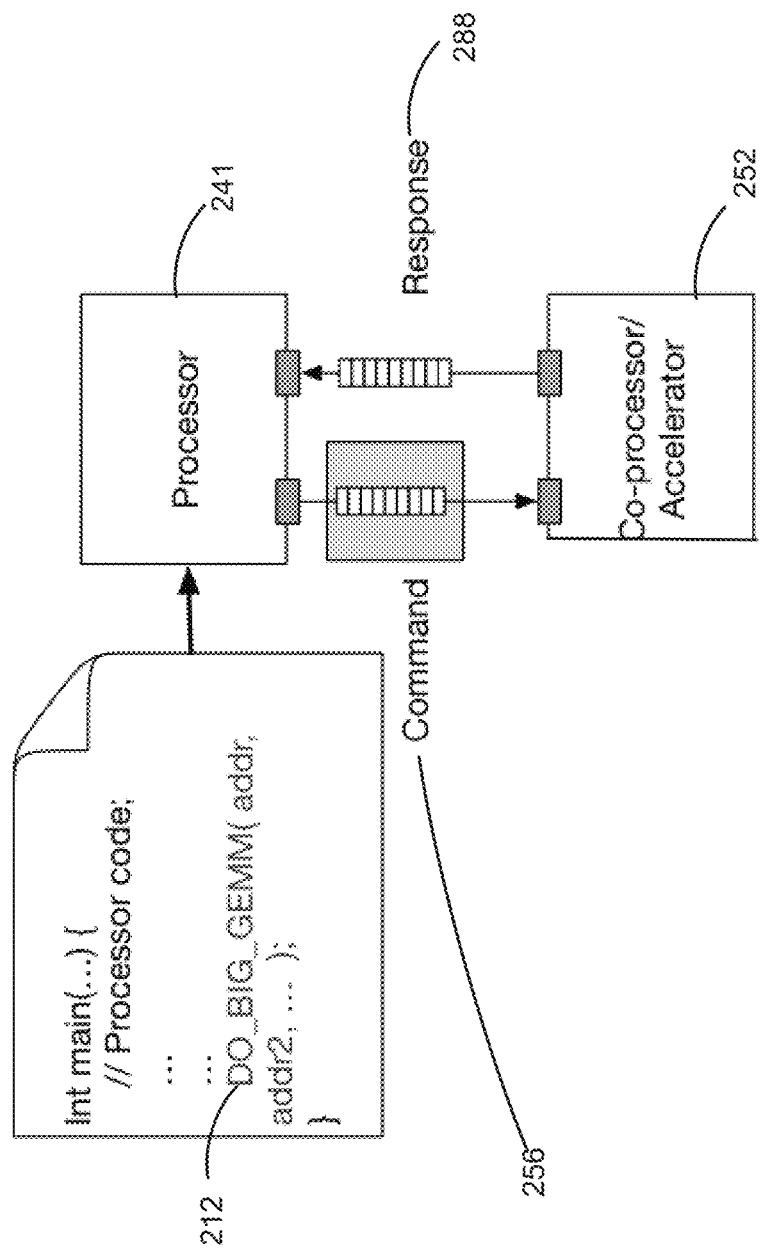
FIG. 2 illustrates a processing system using a coarse-grained architecture comprising a master processor and a slave co-processor.

In the figures, elements having the same designation have the same or similar function.

DETAILED DESCRIPTION OF THE INVENTION

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

Notation and Nomenclature Section

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "dispatching," "decomposing," "executing," "scheduling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The description below provides a discussion of computers and other devices that may include one or more modules. As used herein, the term "module" or "block" may be understood to refer to software, firmware, hardware, and/or various combinations thereof. It is noted that the blocks and modules are exemplary. The blocks or modules may be combined, integrated, separated, and/or duplicated to support various applications. Also, a function described herein as being performed at a particular module or block may be performed at one or more other modules or blocks and/or by one or more other devices instead of or in addition to the function performed at the described particular module or block. Further, the modules or blocks may be implemented across multiple devices and/or other components local or remote to one another. Additionally, the modules or blocks may be moved from one device and added to another device, and/or may be included in both devices. Any software implementations of the present invention may be tangibly embodied in one or more storage media, such as, for example, a memory device, a floppy disk, a compact disk (CD), a digital versatile disk (DVD), or other devices that may store computer code.

The terminology used herein is for the purpose of describing particular embodiments only and is not intended to limit the scope of the present invention. As used throughout this disclosure, the singular forms "a," "an," and "the" include plural reference unless the context clearly dictates otherwise. Thus, for example, a reference to "a module" includes a plurality of such modules, as well as a single module, and equivalents thereof known to those skilled in the art.

Methods of Breaking Down Coarse-Grained Tasks for Fine-Grained Task Re-Scheduling As mentioned above, fine-grained instruction sets are general and flexible. However, fine-grained architectures require increased communication between a master and its co-processors because programs need to be broken down into large numbers of small tasks, which results in increased communication and synchronization overhead. Further, fine-grained processor instruction set architectures need to be able to address instruction dependence because instructions are broken down into large numbers of small tasks that may be dependent on each other. The challenges regarding addressing instruction dependence when using fine-grained instruction set architectures are more pronounced in Artificial Intelligence (AI) accelerator design.

AI accelerator design needs to be generalized in order to handle rapidly changing AI algorithms/operations. Because software for AI systems (e.g., AI models, etc.) evolves rapidly, a coarse-grained processor architecture, which is more difficult to adapt, may not be well-suited for AI systems. To design more generalized and flexible systems, AI processing systems typically need to use fine-grained instruction set architectures. However, these AI processing systems need to address the problem of handling complicated dependencies. Further, in order to improve the performance of fine-grained instruction set architectures, the AI processing systems need to be able to pipeline and re-schedule instructions more efficiently than conventional systems.

Embodiments of the present invention provide a software and hardware system that supports extending the instruction set architecture and adding additional fields or tags within the instruction containing further information regarding dependencies in the instructions. These additional fields or tags provide additional information for the co-processors or accelerators regarding how to pipeline, combine or group fine-grained instructions together. The tagged instruction extension and the hardware support for the extension allow a developer to program the accelerator so as to address dependencies in a program more efficiently. The hardware configured with the extended instruction architecture supports the scaling and optimization of the system.

Embodiments of the present invention further provide a method of breaking down and re-scheduling tasks in a processing system comprising one or more processors (e.g., processors with multiple cores, many-core processors, etc.) and one or more co-processors or accelerators. Each processor, in one implementation, is able to offload tasks to any co-processor in the system. In one embodiment, each co-processor may receive multiple instructions from the processor, where each instruction may execute in one or many cycles. Further, in an embodiment, each co-processor may be configured to group separate instructions and further break down instructions in each group (into finer-grained instructions) based on certain rules and, subsequently, re-schedule the fine-grained instruction sets.

Figure 4:
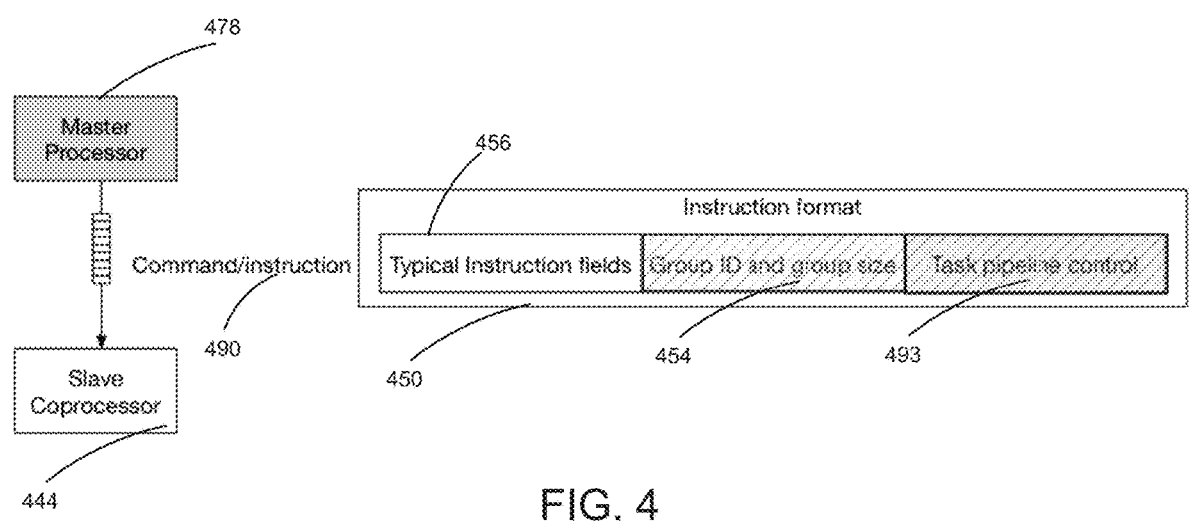
FIG. 4 illustrates the manner in which an instruction set architecture may be extended to encode additional information that facilitates the breaking down and re-scheduling of tasks encoded by the instruction set in accordance with an embodiment of the present invention.

FIG. 4 illustrates the manner in which an instruction set architecture may be extended to encode additional information that facilitates the breaking down and re-scheduling of tasks encoded by the instruction set in accordance with an embodiment of the present invention. As shown in FIG. 4, the master processor 478 dispatches commands and instructions 490 to a slave co-processor (or accelerator) 444, e.g., using a dispatch unit (not shown) of the master processor. Note that the slave co-processor may include (but is not limited to) a graphics processing unit (GPU), a field programmable gate array (FPGA), a digital signal processor (DSP), a network processing unit (NPU), a vision processing unit (VPU), an Artificial Intelligence accelerator, a Tensor processing unit (TPU), a physical neural network (PNN), a complex programmable logic device (CPLD), or any other programmable accelerator etc. Further note that the master processor 478 may include (but is not limited to) a single processor, a many-core processor or a multi-core processor. Also note that while the illustration in FIG. 4 only includes a single master processor and slave co-processor, embodiments of the present invention are not so limited and can encompass, for example, systems with multiple master processors and multiple slave co-processors.

In one embodiment, each instruction 450 (from among instructions 490) issued by the master processor 478 to slave co-processor 444 comprises a typical instruction field 456, which comprises the conventional parts of an instruction.

Figure 3:
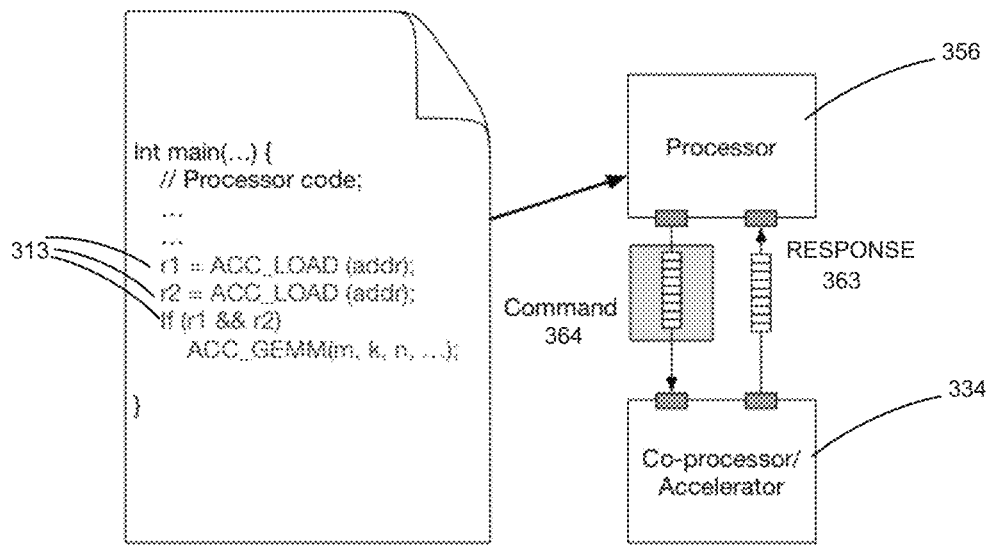
FIG. 3 illustrates a processing system using a fine-grained architecture comprising a master processor and a slave co-processor.

In an embodiment, in addition to the typical instruction field 456, each instruction may also comprise extended instruction fields 454 (comprising information pertaining to group identifier and group size) and 493 (comprising information pertaining to task pipeline control). In one embodiment, the group identifier (ID) and size field 454 are used to group memory operations and computation instructions together for further breakdown. Each instruction with the same group identifier may belong to the same group. For example, referring to FIG. 3, the group identifier and size field 454 may comprise a unique identifier for the instruction set 313 and further may include size information for the instruction set 313 (e.g., three, which is the size of instruction set 313).

In one embodiment, pipeline control field 493 provides rules for inter-instruction breakdown for the co-processors and may also include rules pertaining to the rescheduling of instructions, e.g., executing the instructions in parallel, executing the instructions out-of-order or executing the instructions in non-sequential order. For example, the pipeline control field 493 may provide information regarding instructions that can be performed at the same time (e.g., the first two load instructions in the instruction set 313 may be performed at the same time or in a non-sequential order). Or, for example, the pipeline control field 493 may provide information regarding the manner in which the instructions may be broken down into finer grained operations, where some of the computations for those finer grained operations may be performed in a parallel fashion (e.g., a non-sequential order or out-of-order).

In an embodiment, the co-processor 444 may break down and execute the tasks in each task group (where each group is designated by its own group identifier in the group identifier and size field 454). The tasks in each group may be dependent tasks and the size of each group may vary. In one embodiment, the co-processor breaks down the tasks in each group into finer-grained subtasks that the co-processor can execute. Following the breakdown of the tasks, in an embodiment, the co-processor can re-schedule the finer-grained subtasks to improve performance.

Figure 5:
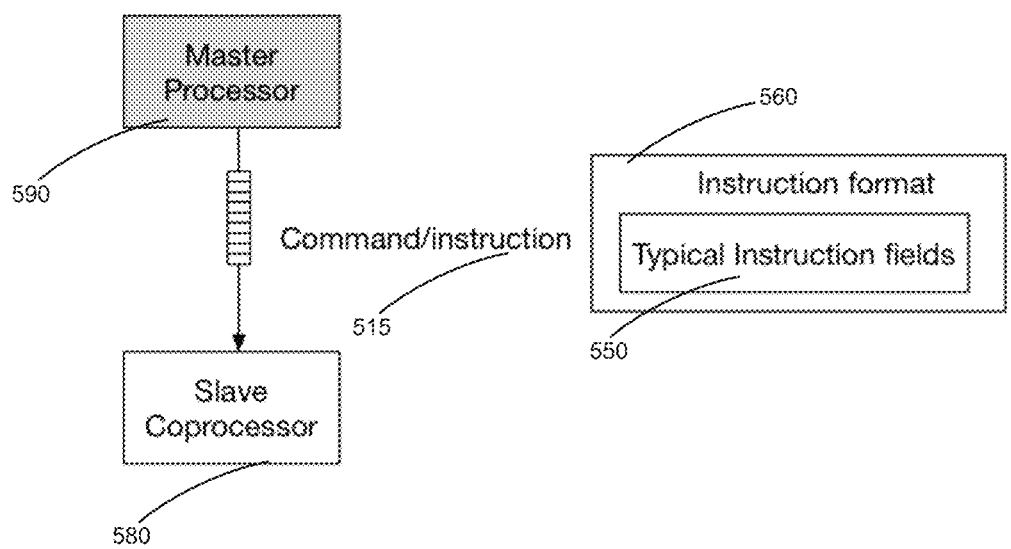
FIG. 5 illustrates an exemplary embodiment in which the task grouping, instruction breakdown and re-scheduling of instructions are performed by the co-processor in accordance with an embodiment of the present invention.

FIG. 5 illustrates an exemplary embodiment in which the task grouping, instruction breakdown and re-scheduling of instructions are performed by the co-processor in accordance with an embodiment of the present invention. As shown in FIG. 5, the master processor 590 issues instructions and commands 515 to the co-processor 580, where each instruction 560 issued by the master processor 590 comprises the typical instruction fields 550, but does not include any information pertaining to grouping, pipelining or re-scheduling.

In the embodiment of FIG. 5, the co-processor 580 comprises a task/instruction queue (not shown), in which all the instructions from the master processor 590 are ingested. A task queue may comprise logic circuitry that is programmable. The task queue may comprise a sliding window within which the dependency of the instructions is considered and analyzed. Accordingly, in this embodiment, the dependencies are analyzed by the co-processor 580. If no dependency group is found within the sliding window, the task at the head of the queue is rescheduled to execute. In one embodiment, the dependencies are analyzed based on explicit instruction symbol names or based on implicit names attributed to the instructions following renaming (e.g., renaming performed after breaking down the instructions).

In one embodiment, the co-processor 580 may be programmable and the breakdown and re-scheduling decisions of any identified group (e.g., from the instruction queue) are performed by the program (at the software level) or by the firmware (at the hardware level).

The exemplary embodiment of FIG. 5 is advantageous in that the grouping and re-scheduling RE transparent to the master processor and its tool chains. Only the co-processor needs to be re-configured in order to change the design of the processing system. Further, it may be easier to add new scheduling schemes after tape out by incurring the cost of a programmable co-processor.

Figure 6:
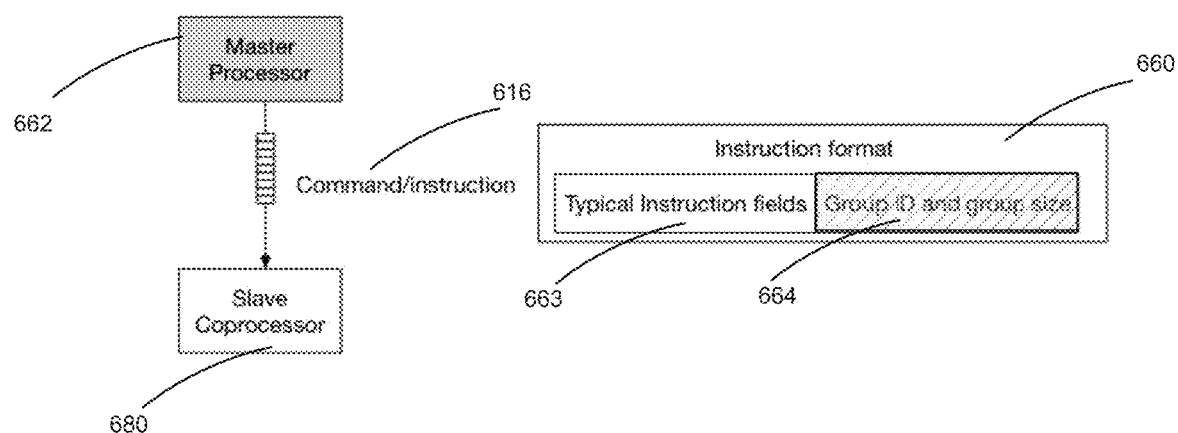
FIG. 6 illustrates an exemplary embodiment in which the task grouping is included in the instructions issued by the master processor while the instruction breakdown and re-scheduling is performed by the co-processor in accordance with an embodiment of the present invention.

FIG. 6 illustrates an exemplary embodiment in which the task grouping is included in the instructions issued by the master processor while the instruction breakdown and re-scheduling is performed by the co-processor in accordance with an embodiment of the present invention. As shown in FIG. 5, the master processor 662 issues instructions and commands 616 to the co-processor 680, where each instruction 660 issued by the master processor 662 comprises the typical instruction fields 663 and a group identifier and group size field 664. Note that the instructions issued by the master processor 662 in this embodiment do not include any pipelining or re-scheduling related fields.

In the exemplary embodiment of FIG. 6, the tasks are already grouped by the master processor 662 and the group information is passed through the group identifier and group size field 664. As mentioned earlier, all tasks (or instructions) with the same group identifier belong to the same group.

In one embodiment, the co-processor 680 comprises one task queue (not shown) for all the tasks. Alternatively, the co-processor 680 comprises multiple task queues, where each task queue handles one group of tasks (or instructions) at any given time. A task queue may comprise logic circuitry that is programmable. In one implementation, a counter (or multiple counters in the case of multiple task queues) tracks the available number of tasks in a task group. Until all tasks are received, the tasks are held in the queue (or queues in the case of multiple queues). If the tasks in any particular group remain in a respective queue longer than a predetermined time period, the tasks will be sequentialized and executed independently.

Similar to the embodiment of FIG. 5, the co-processor 680 may be programmable and the breakdown and re-scheduling decisions of any identified group are performed by the program (at the software level) or by the firmware (at the hardware level).

The exemplary embodiment of FIG. 6 is advantageous in that it provides the master processor (or the programmer of the master processor) the flexibility to describe dependencies within the instruction set that are hard to infer solely by the co-processor. Further, the grouping hardware overhead on the co-processor side may be reduced.

Figure 7:
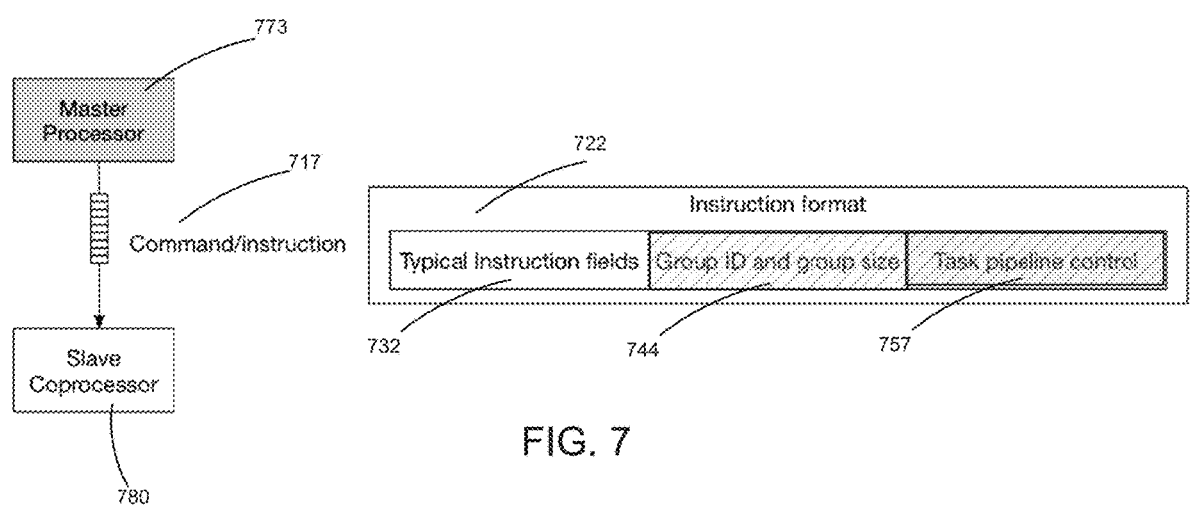
FIG. 7 illustrates an exemplary embodiment in which both the rules for task grouping and the rules for breakdown and rescheduling of tasks are included in the instructions issued by the master processor in accordance with an embodiment of the present invention.

FIG. 7 illustrates an exemplary embodiment in which both the rules for task grouping and the rules for breakdown and rescheduling of tasks are included in the instructions issued by the master processor in accordance with an embodiment of the present invention. Note that FIG. 7 illustrates an implementation that is similar to the one discussed in connection with FIG. 4. As shown in FIG. 7, the master processor 773 issues instructions and commands 717 to the co-processor 780, where each instruction 722 issued by the master processor 773 comprises the typical instruction fields 732, a group identifier and group size field 744, and a task pipeline control field 757 (similar to the one discussed in connection with FIG. 4). The task pipeline control field 757 may, for example, comprise rules for inter-instruction breakdown for the co-processors and may also include information pertaining to the rescheduling of instructions (e.g., hints for rescheduling instructions).

In the exemplary embodiment of FIG. 7, the tasks are already grouped by the master processor 773 and the group information is passed through the group identifier and group size field 744. As mentioned earlier, all tasks (or instructions) with the same group identifier belong to the same group.

In one embodiment, the co-processor 780 comprises one task queue (not shown) for all the tasks. Alternatively, the co-processor 780 comprises multiple task queues, where each task queue handles one group of tasks (or instructions) at any given time. A task queue may comprise logic circuitry that is programmable. In one implementation, a counter (or multiple counters in the case of multiple task queues) tracks the available number of tasks in a task group. Until all tasks are received, the tasks are held in the queue (or queues in the case of multiple queues). If the tasks in any particular group remain in a respective queue longer than a predetermined time period, the tasks will be sequentialized and executed independently.

In this embodiment, the co-processor 780 may either be programmable or non-programmable. The co-processor 780 may be non-programmable because both the grouping and pipelining instructions are performed by the master processor 773. Note that the co-processor 780 may perform the breakdown and re-scheduling decisions of any identified group (e.g., from the instruction queue) in accordance with rules from the task pipeline control field 757 included in the instructions by the master processor 773.

The exemplary embodiment of FIG. 7 is advantageous in that it provides the master processor (or the programmer of the master processor) the flexibility to describe dependencies within the instruction set that are hard to infer solely by the co-processor. Further, the grouping hardware overhead on the co-processor side may be reduced. The embodiment of FIG. 7 also provides the best flexibility to specify a breakdown/re-scheduling methodology from a macroscopic perspective that the co-processor may lack. In other words, the master processor (or programmer) has a more high-level view of the program and can, therefore, specify certain instruction decomposition or re-scheduling methodologies that may be particularly efficient. Also, the master processor specifies both the grouping and the pipelining control in this embodiment, which results in low co-processor complexity.

Figure 8:
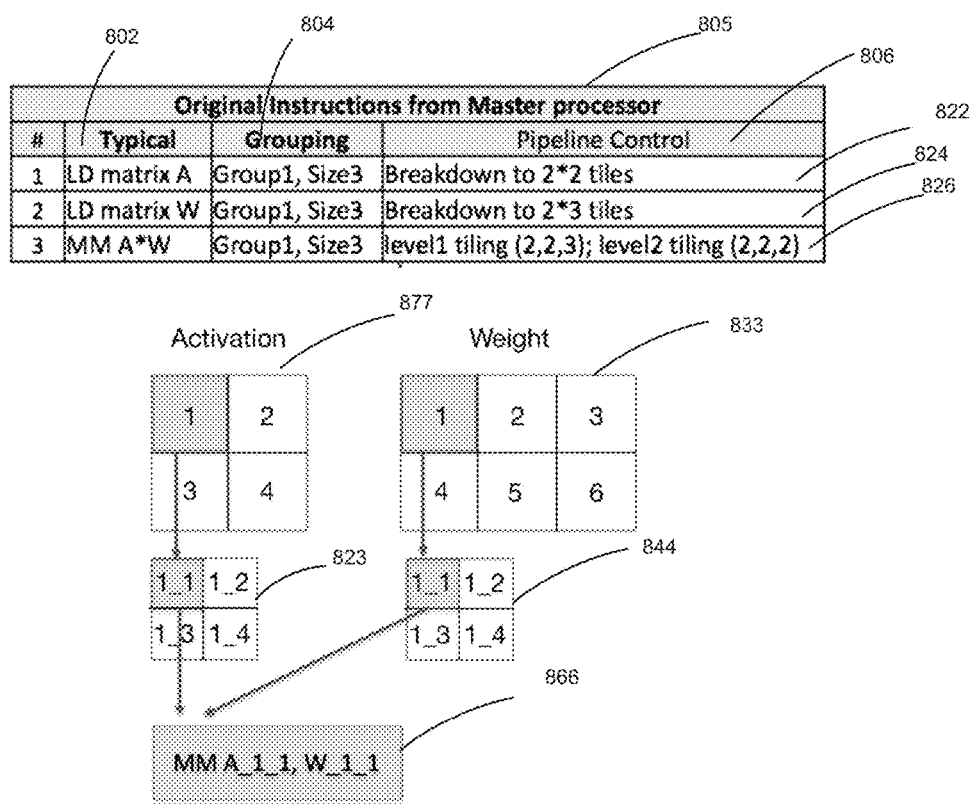
FIG. 8 provides an example of the manner in which matrix multiplication is handled by a processing system in which instructions for task grouping and for task breakdown and rescheduling are included in an extended instruction set in accordance with an embodiment of the present invention.

FIG. 8 provides an example of the manner in which matrix multiplication is handled by a processing system in which instructions for task grouping and for task breakdown and rescheduling are included in an extended instruction set in accordance with an embodiment of the present invention. As shown in FIG. 8, the master processor may transmit a set of instructions 805 to a co-processor, wherein the instructions have been extended to include a group identifier and size field 804 and a pipeline control field 806 in addition to the default field comprising the typical instruction field 802.

The typical instruction field 802 for instruction 1 822 for example comprises an instruction to load an activation matrix. The instruction is extended to further comprise a group identifier (e.g., Group 1) and a group size (e.g., 3 instructions) in group identifier and size field 804. The group size, for example, communicates to a co-processor that it should wait until it receives all three commands before it begins execution. Further, instruction 1 includes the pipeline control field 806, which instructs the co-processor to decompose the activation matrix 877 to 2*2 tiles. Accordingly, the activation matrix 877 will be decomposed into four tiles (2 rows and 2 columns), where the multiplication operation for each tile will be handled independently of the other tiles.

Instruction 2 824 comprises an instruction to load the weight matrix 833. The instruction is extended to further comprise a group identifier (e.g., Group 1) and a group size (e.g., 3 instructions). Further, instruction 2 includes the pipeline control field 806, which instructs the co-processor to decompose the weight matrix 833 to 2*3 tiles. Accordingly, the multiplication for each of the six tiles of the weight matrix will be handled independently of the other tiles.

Finally, instruction 3 826 comprises an instruction to multiply the activation matrix 877 by the weight matrix 833. The instruction is extended to further comprise a group identifier (e.g., Group 1) and a group size (e.g., 3 instructions). Matrices can be decomposed into tiles. The decomposition of a matrix multiplication into smaller tasks can be done with few and simple dependencies amongst tasks. The tiling tasks in the pipeline control field 806 of instruction 3 826 instruct the co-processor to perform the matrix multiplication between the activation matrix and the weight matrix using two levels of tiling. As noted above, the pipeline control field 806 comprises instructions from the master processor to the co-processor on the manner in which instructions should be decomposed and re-scheduled.

The first level of tiling decomposes the activation matrix into 2*2 matrices and the weight matrix into 2*3 matrices. The second level of tiling decomposes each of the tiles from the first level of tiling into 2*2 matrices (for both the activation and weight matrix). Accordingly, as shown in FIG. 8, each of the tiles of the activation matrix 877 and the weight matrix 833 are further broken down into a second level of tiles 823 and 844 respectively. Thereafter, the multiplication operation 866 is performed between each of the decomposed matrices from the second level of tiling.

Figure 9:
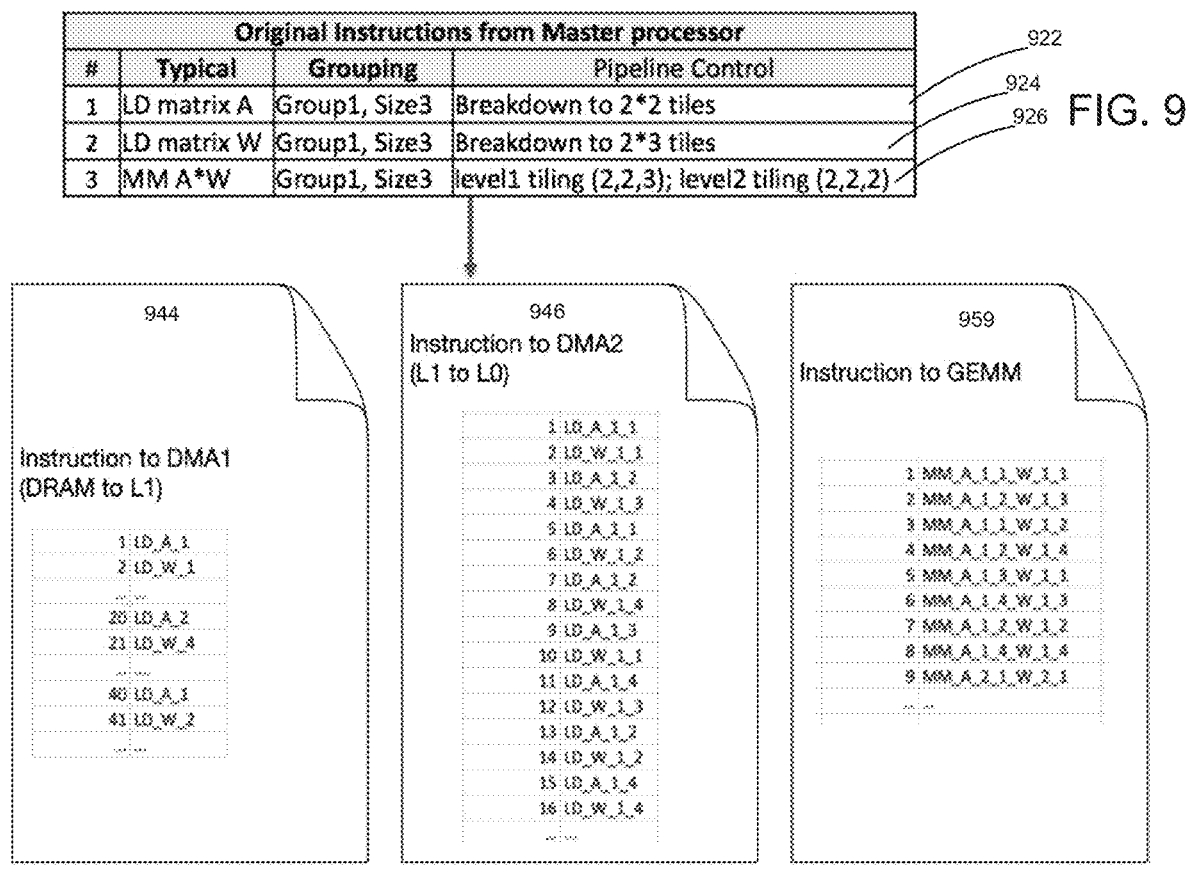
FIG. 9 provides an example of the manner in which matrix multiplication from FIG. 8 is handled in hardware in accordance with an embodiment of the present invention.

FIG. 9 provides an example of the manner in which matrix multiplication from FIG. 8 is handled in hardware in accordance with an embodiment of the present invention. Instructions 922, 924 and 926 correspond to the instructions 822, 824 and 826 from FIG. 8. Sheets 944, 946 and 959 indicate an exemplary manner in which the instructions 922, 924 and 926 are processed by a co-processor that receives instructions 922, 924 and 926 from a master processor. In other words, sheets 944, 946 and 959 indicate how, based on the grouping and pipeline fields encoded within the instructions, decompose the instructions down to fine-grained tasks.

As shown in FIG. 9, the co-processor is able to use the grouping and pipelining fields to be able to re-schedule the fine-grained instructions. For example, as sheet 944 indicates, the first two operations performed by the co-processor include loading a tile of the activation matrix (LD_A_1) and loading a tile of the weight matrix (LD_W_1) from the DRAM to the L1 cache. The co-processor does not need to wait for all of the activation matrix 877 (from FIG. 8) to load before it can start loading tiles of the weight matrix 833 (from FIG. 8). Thereafter, as sheet 946 indicates, the second level of tiling is performed and the co-processor is able to load a portion of the first tile of the activation matrix (LD_A_1_1) and a portion for the first tile of the weight matrix (LD_W_1_1) from the L1 cache to the L0 cache. Again, because of the information in the grouping and pipeline control fields of the instructions, the co-processor can perform these operations before the entirety of the activation matrix 877 and the weight matrix 833, reference in FIG. 8, are loaded.

Finally, as sheet 959 indicates, the multiplication operations between the second hierarchy (or level) of tiles can be started (e.g., MM_A_1_1_W_1_1 is the multiplication operation between the first portion of the first tile of the activation matrix and the first portion of the first tile of the weight matrix). These multiplication operations may be executed by the co-processor before the activation and weight matrices are loaded in their entirety. In this way, the arithmetic logic unit (ALU) of the co-processor may start executing parts of the multiplication operations without needing to wait for the entirety of the activation and weight matrix to load into the L0 cache.

Embodiments of the present invention advantageously allow the co-processor to use the grouping and pipelining control information embedded in instructions to begin performing computations for the instructions before prior operations have been fully performed. This leads to a performance improvement as a result of the inter-instruction pipelining.

Figure 10:
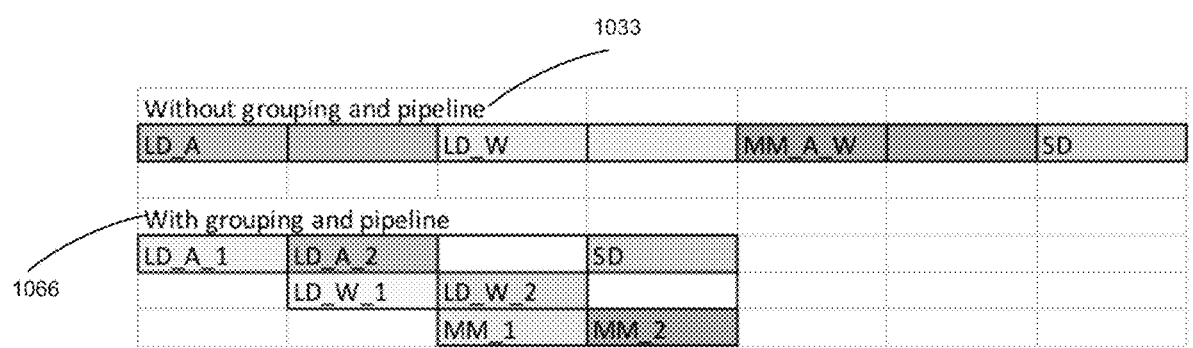
FIG. 10 illustrates the performance improvement that results from encoding the grouping and pipelining fields within an instruction set issuing from a master processor to a co-processor in accordance with embodiments of the present invention.

FIG. 10 illustrates the performance improvement that results from encoding the grouping and pipelining fields within an instruction set issuing from a master processor to a co-processor in accordance with embodiments of the present invention. As shown in FIG. 10, without grouping and pipelining information, the co-processor(s) may have to execute each instruction sequentially. For example, for the set of instructions 1033, without grouping and pipelining information included in the instructions, the co-processor would have to load the activation matrix (LD_A), followed by loading the weight matrix (LD_W) and, thereafter, multiple the activation matrix and the weight matrix (MM_A_W) before storing the result (SD).

With grouping and pipelining information encoded into the instructions received from the master processor, the co-processor is able to decompose the instructions into fine-grained instructions and re-schedule the fine-grained instructions in a pipelined fashion to improve performance. For example, as shown with instruction set 1066, the co-processor is able to load a first portion of the activation matrix (LD_A_1). Thereafter, the co-processor loads a second portion of the activation matrix (LD_A_2) at the same time as it loads a first portion of the weight matrix (LD_W_1). While, the co-processor is loading a second portion of the weight matrix (LD_W_2), it can perform a first multiplication between the first portions of the activation and the weight matrix (MM_1). In the final stage of the pipeline, the co-processor is able to multiply the second portions of the activation and the weight matrix (MM_2) and store the result (SD). As seen from the pipeline illustrations of FIG. 10, the multiplication operations are executed far more rapidly in the case of the pipelined instruction set 1066 as compared with instruction set 1033 (which is sequentially executed).

Embodiments of the present invention provide significant advantages over primarily coarse-grained architectures (with no grouping or pipelining control information). For example, embodiments of the present invention provide more flexibility and also provide various different combinations of instructions. Further, the instruction set architecture is more efficient and comprises shorter instruction lengths compared to traditional coarse-grained architectures.

Embodiments of the present invention are also more advantageous than traditional fine-grained architectures. For example, embodiments of the present invention include dependency information between instructions, thereby, facilitating the pipelining and re-scheduling of instructions in a co-processor. Also, the inter-instruction pipelining allows embodiments of the present invention to provide significant performance advantages as shown in FIG. 10. By decomposing load and store operations for matrix multiplications, for example, embodiments of the present invention can start computing results while simultaneously loading or storing other parts of the matrices involved in the multiplication operation.

Figure 11:
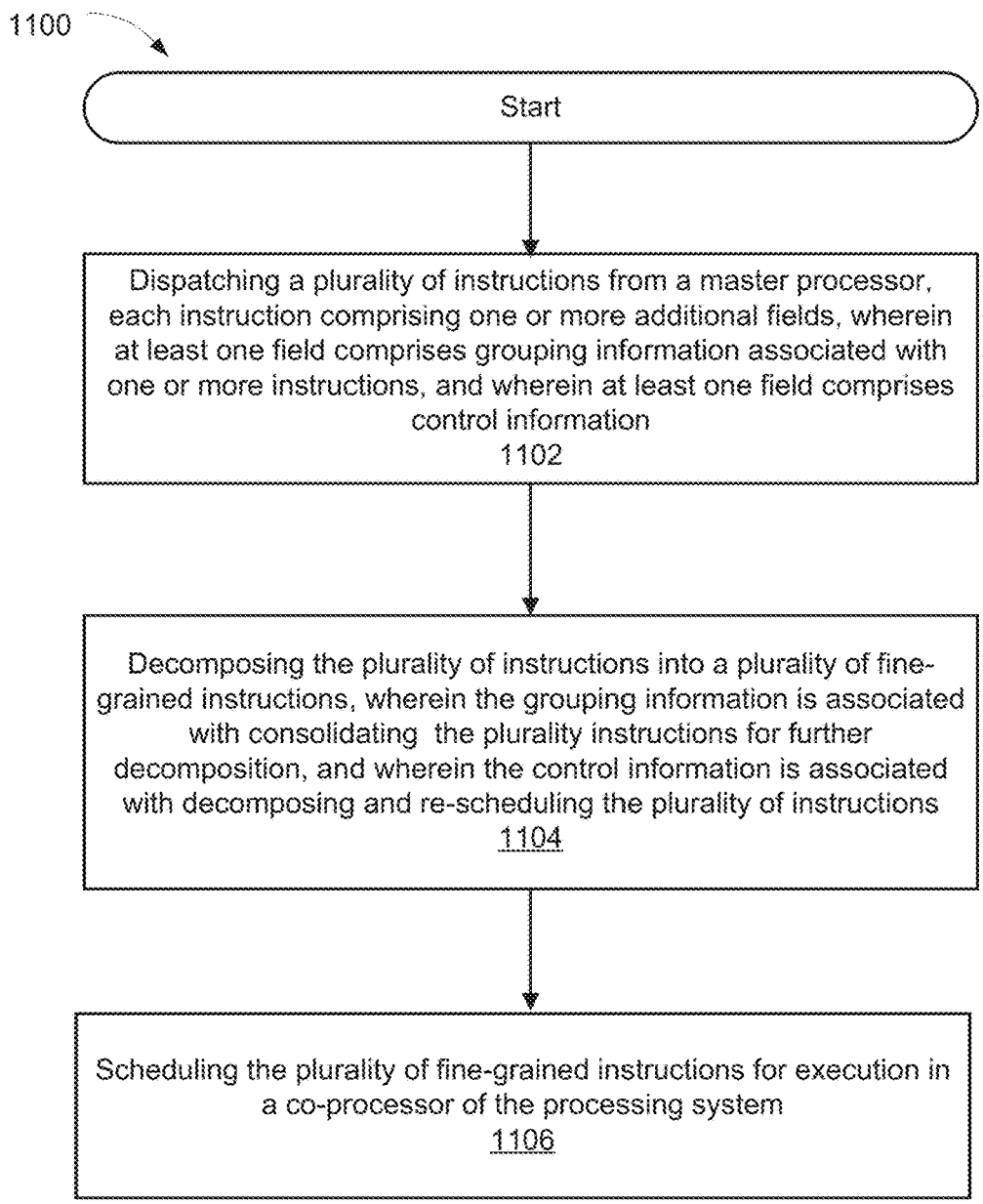
FIG. 11 depicts a flowchart illustrating an exemplary process for decomposing and re-scheduling instructions in a processing system comprising a processing unit and one or more co-processors in accordance with an embodiment of the present invention.

FIG. 11 depicts a flowchart illustrating an exemplary automated process 1100 for decomposing and re-scheduling instructions in a processing system comprising a processing unit and one or more co-processors in accordance with an embodiment of the present invention.

At block 1102, a plurality of instructions are dispatched from a master processor to a co-processor (or multiple co-processors). Each instruction comprises one or more additional fields. In an embodiment, at least one additional field may be associated with grouping the plurality of instructions. In one embodiment, another field may be associated with control information, e.g., pipelining/re-scheduling control information.

At block 1104, the plurality of instructions are decomposed into a plurality of fine-grained instructions. The grouping information is associated with consolidating the plurality of instructions for decomposition as a group. The control information is associated with decomposing and re-scheduling the plurality of finer-grained instructions that result from breaking down the plurality of instructions.

At block 1106, the plurality of fine-grained instructions resulting from decomposing the plurality of instructions are executed by the co-processor of the processing system.

Note that in some embodiments (e.g., the embodiment shown in FIG. 6), the master processor generates the task grouping information included in the instructions. The task breakdown and re-scheduling is performed by the co-processor which is programmable. In a different embodiment (e.g., the embodiment shown in FIG. 5) both the task grouping, the decomposition of the instructions and the re-scheduling are all performed by the co-processor.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of scheduling instructions in a processing system comprising a processing unit and one or more co-processors, the method comprising:
    dispatching a plurality of instructions from a master processor to a co-processor of the one or more co-processors, wherein each instruction of the plurality of instructions comprises one or more fields, wherein at least one field comprises grouping information operable to consolidate the plurality of instructions for decomposition, and wherein at least one field comprises control information;
    decomposing the plurality of instructions into a plurality of fine-grained instructions, wherein the control information comprises rules associated with decomposing the plurality of instructions into the plurality of fine-grained instructions; and
    scheduling the plurality of fine-grained instructions to execute on the co-processor, wherein the scheduling is performed in part in a non-sequential order.

2. The method of claim 1, wherein the processing unit comprises a processor selected from the group consisting of: a multi-core processor; a many-core processor; and a single processor.

3. The method of claim 1, wherein the co-processor comprises a programmable accelerator.

4. The method of claim 1, wherein the co-processor is selected from a group consisting of: a graphics processing unit (GPU); a field programmable gate array (FPGA); a digital signal processor (DSP); a network processing unit (NPU); a vision processing unit (VPU); an Artificial Intelligence accelerator; a Tensor processing unit (TPU); a physical neural network (PNN); and a complex programmable logic device (CPLD).

5. The method of claim 1, wherein the plurality of instructions is related to a matrix multiplication.

6. The method of claim 1, wherein the grouping information comprises a group size and a group identifier associated with the plurality of instructions.

7. The method of claim 1, wherein the control information further comprises rules for scheduling one or more of the plurality of fine-grained instructions.

8. The method of claim 1, wherein the decomposing comprises:
    receiving the plurality of instructions into an instruction queue of the co-processor of the one or more co-processors; and
    decomposing the plurality of instructions in accordance with rules in a control information field of each instruction of the plurality of instructions.

9. The method of claim 1, wherein the control information further comprises rules for scheduling one or more of the plurality of fine-grained instructions, and wherein the scheduling is performed in accordance with the rules.

10. The method of claim 1, wherein the control information further comprises rules for pipelining one or more of the plurality of fine-grained instructions, and wherein the scheduling is performed in accordance with the rules.

11. The method of claim 1, wherein each of the plurality of instructions is a coarse-grained instruction.

12. A processing system for scheduling instructions, the processing system comprising:
    a processing device communicatively coupled with a memory and one or more accelerators, wherein the processing device comprises a dispatch unit operable to dispatch a plurality of instructions to an accelerator of the one or more accelerators, wherein each instruction of the plurality of instructions comprises one or more fields, wherein at least one field comprises grouping information operable to consolidate the plurality of instructions for decomposition; and
    at least one task queue in the accelerator of the one or more accelerators operable to receive the plurality of instructions and comprising logic circuitry, wherein the logic circuitry is configured to:
        decompose the plurality of instructions into a plurality of fine-grained instructions in accordance with a plurality of programmable rules; and
        schedule the plurality of fine-grained instructions to execute on an execution unit of the accelerator in accordance with the plurality of programmable rules.

13. The processing system of claim 12, wherein the accelerator is operable to be programmed with the plurality of programmable rules.

14. The processing system of claim 12, wherein the processing device comprises a processor selected from the group consisting of: a multi-core processor; a many-core processor; and a single processor.

15. The processing system of claim 12, wherein the accelerator is selected from a group consisting of: a graphics processing unit (GPU); a field programmable gate array (FPGA); a digital signal processor (DSP); a network processing unit (NPU); a vision processing unit (VPU); an Artificial Intelligence accelerator; a Tensor processing unit (TPU); a physical neural network (PNN); a complex programmable logic device (CPLD).

16. The processing system of claim 12, wherein the grouping information comprises a group size and a group identifier associated with the plurality of instructions.

17. An apparatus for scheduling instructions, the apparatus comprising:
    a plurality of accelerators communicatively coupled with a processing device; and
    at least one task queue in each accelerator of the plurality of accelerators configured with logic circuitry operable to:
        receive a plurality of instructions from the processing device wherein each instruction of the plurality of instructions comprises one or more fields, wherein at least one field comprises grouping information operable to consolidate the plurality of instructions for decomposition, and wherein at least one field comprises control information;
        decompose the plurality of instructions into a plurality of fine-grained instructions, wherein the control information comprises rules associated with decomposing the plurality of instructions into the plurality of fine-grained instructions; and
        schedule the plurality of fine-grained instructions to execute on the accelerator.

18. The apparatus for claim 17, wherein the processing device comprises a processor selected from the group consisting of: a multi-core processor; a many-core processor; and a single processor.

19. The apparatus for claim 17, wherein the co-processor is selected from a group consisting of: a graphics processing unit (GPU); a field programmable gate array (FPGA); a digital signal processor (DSP); a network processing unit (NPU); a vision processing unit (VPU); an Artificial Intelligence accelerator; a Tensor processing unit (TPU); a physical neural network (PNN); a complex programmable logic device and (CPLD).

20. The apparatus for claim 17, wherein the plurality of instructions is related to a matrix multiplication.

* * * * *